R. F. PICKARD.
VEHICLE AXLE AND BOX.
No. 178,800. Patented June 13, 1876.
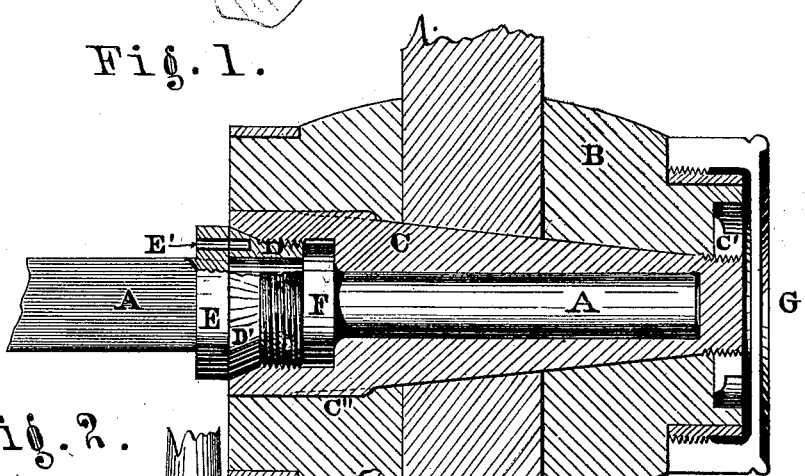
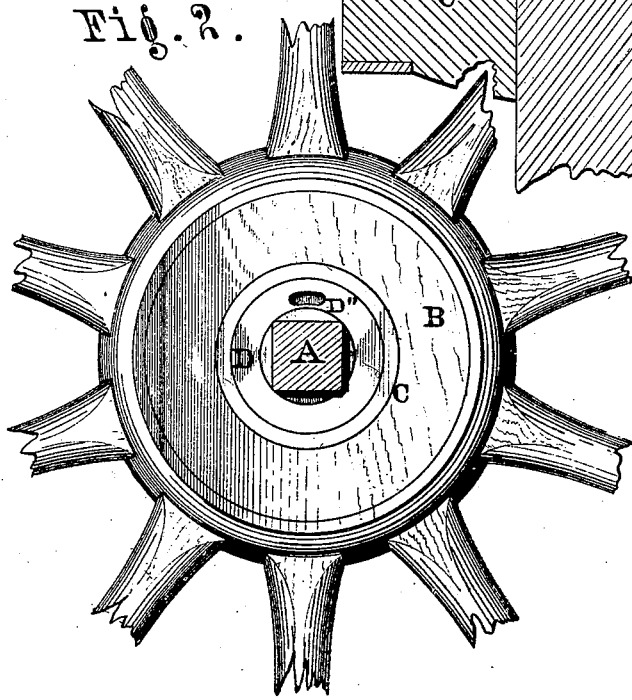
WITNESSES:
Charles F. Hager
Frank Hirsch
INVENTOR.
Richard F. Pickard
by
Michael J. Stark
atty

UNITED STATES PATENT OFFICE.

RICHARD F. PICKARD, OF TONAWANDA, NEW YORK, ASSIGNOR OF ONE-HALF HIS RIGHT TO HENRY H. PICKARD, OF SAME PLACE.

IMPROVEMENT IN VEHICLE-AXLES AND BOXES.

Specification forming part of Letters Patent No. 178,800, dated June 13, 1876; application filed November 12, 1875.

*To all whom it may concern:*

Be it known that I, RICHARD F. PICKARD, of Tonawanda, in the county of Erie and State of New York, have invented certain new and useful Improvements on Carriage-Axles and Boxes; and I do hereby declare that the following description, taken in connection with the accompanying drawings, forms a full, clear, and exact specification.

My invention relates to improvements on vehicle-axles and boxes; and it consists in the peculiar arrangement of parts and details of construction, as hereinafter fully described, and pointed out in the claim.

In the drawings, Figure 1 is a section through the hub and box, and Fig. 2 an end view of the same.

Like letters of reference indicate similar parts in the two figures.

A is the axle, and B the hub. They vary from the usual construction in such points as hereinafter set forth. C is the bell-shaped hub-box. It has an enlarged head, provided with a screw-thread internally, and its bore is of less depth than its body. Its tail end is, therefore, solid, and provided with a screw-thread externally, wherewith engages a nut, C'. The box is provided with projections C'', to prevent it from turning within the hub B. D is a sleeve, having a screw-thread externally, to engage with the enlarged head of the box C. It has one or more recesses, D'', in its face, serving as stops to enable its removal, and when attached to the box C it will revolve therewith upon the axle A. E and F are collars, one of which being permanently welded or otherwise attached to the axle in the process of forging, and the other shrunk thereon after the axle is turned and the sleeve D placed in proper position. E' is an opening or passage in the collar E, corresponding in configuration to that of the recess D'' in the sleeve D. G is a cap, screwed or otherwise fixed to the hub B. The bore of the hub corresponds to the external contour of the box C, and this is secured in the hub by the nut C', set in a recess in the front end or face of the hub, which nut, being screwed up, draws the box into said hub, and thus securely fastens it therein. The box C is movably attached to the axle A by the sleeve D bearing against the collar F, and fixed to said box, as described. This sleeve D is held in frictional contact with the hub-box by means of the conical shoulder D' engaging with the corresponding mouth of the box, and its thread externally, and that of the box internally, are right and left, as occasion demands. The sleeve and box are attached and detached by means of a key or bolt introduced through the passage E' into the recess D'', whereby the sleeve is made permanent with the axle, and the wheel being turned in the proper direction, the box will engage or disengage with said sleeve, as the case may be. The conical head of the sleeve may be made square-faced, if desired, and provided with the recesses D'', without changing the nature of my invention.

Having thus fully described my invention, so as to enable others skilled in the art to which it pertains to make and use the same, I desire to secure to me by Letters Patent of the United States the following claim:

The combination, with the axle A, of the collars E and F and the sleeve D, arranged to revolve between said collars, when the collar E is provided with a passage, E', and the sleeve with a recess or recesses, D'', registering with said passage E', for the insertion of a bolt or key, to facilitate the attachment or detachment of the hub B and axle A, substantially as described.

In testimony whereof I have hereto set my hand this 9th day of November, A. D. 1875, in the presence of two subscribing witnesses.

R. F. PICKARD.

Witnesses:
 MICHAEL J. STARK,
 FRANK HIRSCH.